Patented Jan. 1, 1935

1,985,896

UNITED STATES PATENT OFFICE 1,985,896

COATING COMPOSITION RETAINING FLEXIBILITY AND ANTIOXIDANT THEREFOR

James K. Hunt, Wilmington, Del., assignor to E. I. du Pont de Nemours & Company, Wilmington, Del., a corporation of Delaware No Drawing. Application June 4, 1929, Serial No. 368,446

7 Claims. (Cl. 134—56)

This invention relates to new and useful compositions of matter and the method of making them, and more particularly to compositions containing antioxidants, drying oils and driers.

In the preparation of paint, varnish, and linoleum compositions it is customary to add positive catalysts or driers, such as compounds of cobalt, manganese or lead, to accelerate the oxidation or drying of the composition when applied as a film or, in the case of linoxyn for linoleum, to accelerate the necessary oxidation of the oils to linoxyn. Most substances, however, which satisfactorily accelerate drying continue to exert an oxidizing action on the composition after it has dried, causing it to lose elasticity and tensile strength and have a decreased life due to checking, cracking and more rapid disintegration.

It has previously been proposed to add phenols to compositions containing China wood oil to prevent this undue oxidation subsequent to drying to the hard stage but, so far as known to me, all previous attempts to prevent the deterioration of compositions containing linseed oil by the addition of phenols, without objectionably retarding initial oxidation, have failed. I have discovered, however, that when certain phenols are added to compositions containing linseed oil the desired results can be obtained. Examples of suitable phenols for use with linseed oil are ortho dihydric phenol, the trihydric phenols, and the derivatives of these phenols. The same phenols also produce a materially improved result, compared with other inhibitors, when they are used with China wood oil. I have also found that by adding guanidines to compositions containing various drying oils, for a similar purpose, I can secure a materially improved result.

It is therefore an object of this invention to produce compositions of matter which will have an increased life when applied as a film by retaining their flexibility for a longer period, preferably without retarding drying to the hard stage to an objectionable degree.

It is a further object of this invention to produce compositions of matter which exhibit satisfactory drying properties when applied as a film without sacrificing the life of the composition.

With the above and other objects in view, which will be apparent as the description proceeds, I have set forth below several illustrative embodiments of my invention by way of illustration and not as a limitation, all of such compositions producing films which resist objectionable checking and cracking for longer periods of time than films from compositions containing no antioxidant.

EXAMPLE 1

*Test composition*

| | | |
|---|---|---|
| Alkali refined linseed oil | 500 g. | |
| Thinner | 1750 g. | |
| Cobalt (as cobalt linoleate) | 0.15 g. | (0.03% on oil basis) |
| Diphenyl-guanidine | 5. g. | (1% on oil basis) |

Example 1 illustrates the type of composition used for evaluating antioxidants. A film of this or similar composition is laid down on filter paper and, after evaporation of the solvent, is suspended within a flask with an attached manometer. The flask is then sealed and maintained at a constant temperature, the rate and degree of oxidation being determined by observing the decrease in pressure within the flask, as indicated by the attached manometer. Quantitative oxidation experiments showed the following percentage oxidation values, which represent the percentage by weight of oxygen taken up by the film of oil.

| Agent used | Per cent oxidation after— | | |
|---|---|---|---|
| | 3 hours | 140 hours | 400 hours |
| None (control) | 13% | 31.5% | 34.0 |
| Diphenyl-guanidine | 13 | 27. | 29.5 |
| Di-ortho-tolyl-guanidine | 13 | 25. | 27.5 |

The above figures indicate that diphenyl-guanidine and di-ortho-tolyl-guanidine, while not inhibiting initial oxidation up to about 13%, do materially retard the subsequent oxidation which contributes to the ultimate failure of drying oil compositions, particularly those laid down in films, such as paints and varnishes.

While many phenolic bodies, such as alpha-naphthol, have been found to materially retard initial oxidation or drying, I have found that certain phenolic bodies, such as guaiacol, behave in somewhat the same way as the guanidines.

That inhibitors of the guanidine type do increase durability has been demonstrated experimentally by accelerated durability tests on certain paint-type compositions containing a drying oil, whereby it was found that films laid down from compositions containing 0.1% of these inhibitors (on oil basis) resisted checking and cracking for longer periods of time than did the corresponding untreated control.

EXAMPLE 2

*Spar varnish*

| | |
|---|---|
| Ester gum | 100 lbs. |
| China wood oil | 313 lbs. |
| Linseed oil | 37 lbs. |
| Litharge | 5 lbs. |
| Cobalt acetate | 0.50 lbs. |
| Mineral spirits | 525 lbs. |
| Diphenyl-guanidine | 0.35 lbs. (0.1% on oil basis) |

The above varnish has also been made, substituting 0.1% of guaiacol or di-ortho-tolyl-guanidine for diphenyl-guanidine. None of the above agents increased the drying time unduly.

EXAMPLE 3

*Outside white house paint*

| | Pounds |
|---|---|
| Linseed oil | 300 |
| Liquid drier (lead-manganese) | 15 |
| Titanox | 330 |
| Zinc oxide | 180 |
| Asbestine | 45 |
| Amorphous silica | 45 |
| Mineral spirits | 62 |
| Guaiacol | 3 (1% on oil basis) |

This particular paint dried in 9 hours as compared with 8 hours for the control to which no agent was added.

EXAMPLE 4

*Linoleum cement*

| | Pounds |
|---|---|
| Linoxyn | 1000 |
| Rosin | 187 |
| Kauri | 62 |
| Di-ortho-tolyl-guanidine | 1 (0.1% on oil basis) |

Although the above examples emphasize the use of guanidines as inhibitors of oxidation subsequent to drying, I do not wish to be limited to guanidines, since I have found that certain phenolic bodies behave in a somewhat analogous manner. Suitable phenolic inhibitors are ortho dihydric phenol (catechol); trihydric phenols, such as pyrogallol; and derivatives of these phenols, such as guaiacol, eugenol, and pyrogallol dimethyl ether.

The selection of a suitable type of inhibitor for compositions containing a drying oil will depend upon the type of composition in which the antioxidant is to be used and upon the manner in which the composition, if a paint or varnish type material, is to be dried. In a linoleum cement, where the linoxyn (oxidized linseed oil) has been oxidized to the desired stage before incorporating the inhibitor, not only are such agents as di-ortho-tolyl-guanidine effective in retarding oxidation of the finished linoleum, but also certain phenolic bodies which, in general, are known to unduly retard the initial drying of paints and varnishes. Also, the character of inhibitor for a pigmented coating composition may differ markedly from that for clear varnishes. Further, in coating compositions which are to be force dried, inhibitors may be used which would, in general, unduly retard the drying of ordinary coating compositions at room temperature.

The proper amount of inhibitor to be used depends also upon the type of composition in which it is to be used, the manner in which the composition is to be dried, and the kind and amount of drying oil and drier in the composition. For example, the paint disclosed in Example 3 contained 1% of guaiacol (on oil basis), and yet drying was not materially retarded, whereas this amount of guaiacol seriously retards the drying of ordinary varnishes. I have found that more of a given agent can be used with impunity, as regards retardation of drying, in a composition which is to be force-dried than in one to be dried at room temperature. I have also found that the rate and degree of oxidation of China wood oil are apparently repressed to a greater extent by a given amount of an agent than in the case of linseed oil, although this is probably largely offset by the fact that polymerization, as contrasted with oxidation, plays a more important role in the drying of China wood oil films than in the drying of linseed oil films. I have found that more inhibitor can safely be used in a long oil spar varnish than in a short oil rubbing varnish, although on the basis of the oil content the percentage might well be the same. It is not, in general, expedient to use as much of a given inhibitor with a lead drier as with a cobalt drier, since lead salts are usually less active in promoting drying than cobalt salts. The smaller the amount of a given drier used, the smaller the amount of a given antioxidant which may be expediently used with it.

I have found that the guanidines, particularly the di-substituted guanidines, and more particularly diphenyl-guanidine, and di-ortho-tolyl-guanidine, are best for most purposes. I do not, however, wish to be limited to the use of diphenyl-guanidine or di-ortho-tolyl-guanidine or to the particular concentrations indicated in the above examples, since I have found that other agents and other concentrations, and particularly from 0.1% to 1.0%, as explained herein, give promising results. In general I have found that it is satisfactory to add amounts of inhibitor which do not retard initial oxidation up to about 10 to 15%, but which do retard further oxidation.

Likewise, I do not wish to be limited to the use of any particular drying oil or drier, or to any particular type of composition, except those containing drying oils and driers and linoxyn compositions from which linoleum is made. Antioxidants should also be useful to overcome the oxidation and resultant cracking of the paints with which the design is printed on the face of linoleum and on the felt-base type of floor covering.

It will therefore be apparent that I have invented a method of making compositions, and especially coating compositions, which, when applied as films, will have increased life due to decreased oxidation subsequent to drying, which subsequent oxidation normally results in brittle, non-flexible films that are no longer capable of following the expansions, contractions or bending of the underlying surfaces without checking or cracking.

As many apparently widely different embodiments of this invention may be made without departing from the spirit and scope thereof, it is to be understood that I do not limit myself to the specific embodiments thereof, except as defined in the appended patent claims.

I claim:

1. A composition of matter which, when applied in the form of a thin film, has a substantially normal initial drying rate combined with the retention of flexibility, said composition of matter containing a drying oil, an accelerator of oxidation, and an aryl-substituted guanidine.

2. A composition of matter which, when applied in the form of a thin film, has a substantially normal initial drying rate combined with the retention of flexibility, said composition of matter containing a drying oil, an accelerator of oxidation, and diphenyl-guanidine.

3. A composition of matter, which when applied in the form of a thin film, has a substantially normal initial drying rate combined with the retention of flexibility, said composition of matter containing a drying oil, an accelerator of oxidation, and di-ortho-tolyl-guanidine.

4. The method of producing a composition of matter which, when applied in the form of a thin film, will have a substantially normal initial drying rate combined with the retention of flexibility through decreased oxidation subsequent to drying, which comprises mixing an aryl-substituted guanidine with materials, including drying oils and driers, otherwise suitable for forming a coating composition.

5. The method of producing a composition of matter that will remain flexible through decreased oxidation subsequent to drying without materially retarding initial drying, which comprises mixing an aryl-substituted guanidine with materials otherwise suitable for forming a floor covering, said materials including, as the principal non-volatile vehicle, oxidized and polymerized drying oil and drier.

6. The method of controlling the life of coating compositions containing drying oil and drier which, when applied in the form of a thin film, will have a substantially normal initial drying rate combined with the retention of flexibility, which consists in adding a sufficient quantity of an aryl-substituted guanidine thereto to retard oxidation after initial oxidation has proceeded up to about 10–15%, the amount of the aryl-substituted guanidine to be added being previously determined by testing it in another composition in comparison with a control of the same composition without the aryl-substituted guanidine, and the proper amount of aryl-substituted guanidine to be added being that which will prevent a greater degree of oxidation of a film containing the inhibitor after 400 hours than occurs after 140 hours without the aryl-substituted guanidine, without materially retarding initial oxidation.

7. The method of producing a composition of matter that will remain flexible through decreased oxidation subsequent to drying without materially retarding initial drying, which comprises mixing a guanidine with materials, including oxidized and polymerized drying oil and drier, otherwise suitable for forming a floor covering.

JAMES K. HUNT.

CERTIFICATE OF CORRECTION.

Patent No. 1,985,896.  January 1, 1935.

JAMES K. HUNT.

It is hereby certified that error appears in the printed specification of the above numbered patent requiring correction as follows: Page 3, second column, strike out lines 26 to 33 inclusive, comprising claim 7; and that the said Letters Patent should be read with this correction therein that the same may conform to the record of the case in the Patent Office.

Signed and sealed this 12th day of March, A. D. 1935.

Leslie Frazer (Seal)  Acting Commissioner of Patents.